United States Patent [19]
Kammermeier et al.

[11] Patent Number: 6,116,825
[45] Date of Patent: Sep. 12, 2000

[54] ROTATING CUTTING TOOL WITH A COOLANT PASSAGE AND A METHOD OF PROVIDING IT WITH COOLANT

[75] Inventors: Dirk Kammermeier, Stein; Bernhard Borschert, Nürnberg, both of Germany

[73] Assignee: Kennametal Hertel AG Werkzeuge + Hartstoffe, Fürth, Germany

[21] Appl. No.: 09/020,020

[22] Filed: Feb. 6, 1998

Related U.S. Application Data

[63] Continuation-in-part of application No. PCT/EP96/03489, Aug. 7, 1996.

[30] Foreign Application Priority Data

Aug. 8, 1995 [DE] Germany ............... 295 12 745 U
Feb. 21, 1996 [DE] Germany ............... 296 02 997 U

[51] Int. Cl.⁷ .................... B23B 51/06; B23B 35/00
[52] U.S. Cl. ................ 408/1 R; 408/59; 408/226; 408/238; 279/20
[58] Field of Search .................. 408/1 R, 56, 57, 408/59, 226, 238, 239 A; 279/20; 409/136

[56] References Cited

U.S. PATENT DOCUMENTS

| | | | |
|---|---|---|---|
| 83,371 | 10/1868 | Foster | 408/57 |
| 288,957 | 11/1883 | Soderstrom | 408/59 |
| 580,399 | 4/1897 | Hoenscheid | 408/59 |
| 594,329 | 11/1897 | Cox, Jr. | 408/59 |
| 935,484 | 9/1909 | Gallowics | 408/61 |
| 1,208,164 | 12/1916 | Kelly | 76/108.6 |
| 2,427,085 | 9/1947 | Allison | 408/59 |
| 2,478,846 | 8/1949 | Smith | 408/59 |
| 2,847,880 | 8/1958 | Neidig | |
| 3,153,885 | 10/1964 | Keller et al. | 408/59 |
| 4,090,804 | 5/1978 | Haley | 408/59 |

FOREIGN PATENT DOCUMENTS

| | | | |
|---|---|---|---|
| 0482982 | 4/1992 | European Pat. Off. | |
| 543024 | 8/1922 | France | 408/59 |
| 1289386 | 2/1969 | Germany | |
| 4327232 | 1/1995 | Germany | |
| 19618540 | 1/1997 | Germany | |
| 58-102613 | 6/1983 | Japan | |
| 29794 | 12/1884 | Sweden | |
| 133433 | 8/1902 | Sweden | |
| 9702109 | 1/1997 | WIPO | |

Primary Examiner—Daniel W. Howell
Attorney, Agent, or Firm—Nils H. Ljungman & Associates

[57] ABSTRACT

A method for supplying the working parts of a boring tool, in particular a drill, with a lubricant which both cools and lubricates the drill. A dispenser is connected directly or indirectly to the drill to enable lubricant to be fed to the working parts of the drill through at least one channel in the drill. A boring tool, in particular a drill, is also disclosed with a shaft, a cutter, at least one internal lubricant channel and at least one reservoir being fitted as a dispenser for the lubricant. The reservoir is directly or indirectly connected to the drill by mechanical connections and to the at least one lubricant channel to permit the passage of lubricant. In addition, a tool holder designed to hold the drill is disclosed. The tool holder has an internal dispenser for the lubricant. The dispenser is connected, when the drill is fixed in place, to the at least one lubricant channel in the drill to permit the passage of lubricant.

16 Claims, 8 Drawing Sheets

ROTATING CUTTING TOOL WITH A COOLANT PASSAGE AND A METHOD OF PROVIDING IT WITH COOLANT

CONTINUING APPLICATION DATA

This application is a Continuation-In-Part Application of International Application No. PCT/EP96/03489, filed on Aug. 7, 1996, which claims priority from Federal Republic of Germany Application No. 295 12 745.7, filed on Aug. 8, 1995, and Federal Republic of Germany Application No. 296 02 997.1, filed on Feb. 21, 1996. International Application No. PCT/EP96/03489, published as WO 97/05987 on Feb. 20, 1997, was pending as of the filing date of this application and designated the USA as a designated state.

BACKGROUND OF THE INVENTION

1. Field of the Invention

Method of providing a rotating cutting tool with lubricating coolant, as well as a tool and a tool holder for carrying out the method.

2. Background Information

One problem encountered in the cutting of work pieces, and of metal work pieces in particular, is that the boring tool, such as a drill, reamer or a rotating tool in general (the following description relates in particular to drills), heats up during the cutting process along with the material of which the work piece is made. In automatic mass production operations in particular, cooling and lubrication using a lubricating coolant (designated a "lubricant" below) is therefore necessary. In wet machining processes, a large excess of liquid lubricant is introduced into the hole as it is being drilled. This type of lubricating and cooling action entails relatively high costs for equipment, not to mention the costs of the lubricant supply, the necessary cleaning, etc. In drilling operations, moreover, it is not always possible to deliver the lubricant directly into the hole being drilled. Therefore, lubricating systems are used in which the lubricant is transported by means of transport devices via the spindle of a drilling machine and at least one lubricant channel in the drill to the site of the drilling. The site of the drilling is approximately in the vicinity of the major cutting edges or the chip faces of the drill. In these known lubrication systems a relatively large quantity of lubricant is required, because the supply lines which lead from the supply device to the drill or to the spindle of the drill must be filled with lubricant. In addition, a precise and controlled dispensing of small quantities of lubricant is very difficult to achieve using the conventional delivery devices.

OBJECT OF THE INVENTION

The object of the present invention is therefore a method, as well as a boring tool and tool holder to carry out the method, to accurately dispense a controlled and extremely small quantity of lubricant using technically simple means.

SUMMARY OF THE INVENTION

The present invention teaches that this object can be accomplished in accordance with one possible embodiment by a method for supplying rotating cutting tools, in particular a drill, with a lubricant which is used for cooling and/or lubrication. The lubricant is contained in a reservoir which is connected directly or indirectly to the boring tool and which reservoir functions as a dispenser from which the lubricant is transported through at least one lubricant channel and at least one discharge opening in the boring tool to a working part to be lubricated and/or cooled.

The present invention teaches that this object can also be accomplished in accordance with one possible embodiment by a boring tool, in particular a drill, to carry out the method. The boring tool has a shank, a cutter and at least one internal lubricant channel. At least one reservoir which functions as a dispenser for a lubricant is directly or indirectly connected mechanically to the boring tool and hydraulically to the at least one lubricant channel.

In addition, the present invention teaches that this object can be accomplished in accordance with one possible embodiment by a tool holder for holding a boring tool. The tool holder has an integrated dispenser for a lubricant, whereby the dispenser, when the boring tool is held in the tool holder, is hydraulically connected to at least one internal lubricant channel of the boring tool.

In the method of the present invention, a lubricant which is used for cooling and/or lubrication is contained in a reservoir. The reservoir acts as a dispenser and is directly or indirectly connected to the boring tool. The lubricant is transported from this dispenser to the respective working parts by at least one lubricant channel in the boring tool.

An advantage of the method taught by the present invention is that expensive supply devices, relatively expensive rotary transmission feed-throughs or adjustable pump units are no longer necessary. The dispenser can be connected directly to the boring tool, for example, and rotates along with the boring tool during the cutting of the work piece. A further advantage of the method taught by the present invention is that a precisely controlled quantity of lubricant can be made available for one, or preferably, for a plurality of drilling processes. For example, it is also conceivable that a dispenser, which dispenser is integrated into the shank of a boring tool, can contain a quantity of lubricant which is sufficient for the entire useful life of the boring tool. Such a boring tool can always be independently supplied with a sufficient quantity of lubricant, in particular, an extremely small quantity of lubricant, from a lubricant supply device which is installed on a drilling machine.

In one method taught by the present invention, there are a variety of possibilities for the propulsion of the lubricant flow during a drilling or cutting process. The propulsion force for the lubricant flow can advantageously be generated by locating the dispenser above the working parts of the boring tool. This situation occurs when the drilling operation is essentially from top to bottom. In an embodiment where discharge openings are located on the side of the boring tool, the centrifugal force which is generated by the rotation of the boring tool also acts on the lubricant. The lubricant transport caused by the hydrostatic pressure of the dispenser, which dispenser is located above the working parts, is therefore generally assisted by centrifugal forces. To prevent the lubricant from escaping when the boring tool is not in use, it is advantageous to use a lubricant which is solid or highly viscous at room temperature and which liquefies at the temperatures which are encountered during cutting operations. The lubricant, which is solid or highly viscous at room temperature, is retained in the lubricant channel by adhesion or cohesion forces. When the boring tool is in use, the boring tool heats up after a brief period of operation to a point where the lubricant is converted into a liquid or less viscous state. Gravity then acts on the lubricant, as well as the centrifugal forces in the vicinity of the discharge openings, so that the lubricant is transported to the working parts of the boring tool. The lubricant can also be liquid even at room temperature, in which case the lubricant can be prevented from escaping through the discharge openings by coordinating the cross sectional area of the discharge opening and the viscosity of the lubricant so that the adhesion and cohesion forces are greater than the forces generated by the hydrostatic pressure.

The transport of the lubricant to the working parts of the boring tool can also be advantageously promoted by a capillary fluid transport device. This term is used to include, among other things, sponge-like or fibrous storage media which are used to fill at least the lubricant channel or channels. It may also be advantageous if the dispenser is filled with such a storage medium. In this method, the lubricant is discharged from the discharge openings by centrifugal force, and the discharge of the lubricant may also be assisted by a temperature-dependent reduction in viscosity. The lubricant, which lubricant is consumed in the working parts of the boring tool, is replaced by capillary action with lubricant which is discharged from the storage medium in the lubricant channel and the dispenser. The advantage of such a method is that the cooling and lubrication action can be accomplished practically independently of the current position of the boring tool.

Lubrication which is independent of the position of the boring tool is also possible if there is pressure in the dispenser or if such a pressure is generated. In this manner, even higher-viscosity lubricants and those lubricants which do not sufficiently liquefy even at the operating temperatures and which could not be transported to the working parts without the application of pressure can be used. The quantity of lubricant or the lubricant flow can generally be controlled without entailing any major expense or effort by selecting an appropriate size of the discharge openings. With reference to a defined speed of rotation of the boring tool, it thereby becomes possible to achieve a relatively precisely controlled flow of lubricant.

In one method taught by the present invention, the dispenser can be integrated into the boring tool itself. A tool which is particularly suitable for this method is a drill with a shank, which shank has a corresponding cavity. The dispenser, however, can also be a separate reservoir which can be connected to the boring tool. An additional possibility is to locate the dispenser in a tool holder which is also used to hold the boring tool.

An embodiment of a boring tool which is suitable for carrying out the method taught by the present invention has a shank, a cutter and at least one internal lubricant channel. In addition, at least one dispenser is directly or indirectly connected mechanically to the boring tool and hydraulically to the at least one lubricant channel. In this manner, a boring tool is created which has an integrated lubrication system. As described above, this type of boring tool can be used independently of a lubricant supply device which is installed on a machine tool or drill. Since each drill carries its own supply of lubricant along with it, so to speak, it is possible to supply different types of drills with individual lubricants which are suited to the respective drilling conditions. This measure is not possible on conventional lubricant supply systems without additional major expense and effort. Likewise, the cleaning or changing of the lubricant in conventional lubricant supply systems is a relatively expensive and time-consuming process.

A dispenser taught by the present invention can be advantageously provided in the form of a recess, which recess is in the form of a blind hole in the shank of the boring tool. The recess extends from the shank-side end surface toward the cutter of the boring tool.

It is particularly advantageous if the dispenser is realized in the form of a removable cartridge, which removable cartridge can be inserted into a receptacle recess in the shank of the drilling tool. It is then possible, for example, on high-quality boring tools which have long operating lives, to refill an empty lubricant reservoir very easily. In this manner it is also possible to keep the dispensers small and also to keep the quantity of lubricant stored in the boring tool small. To make the lubricant replacement process as easy as possible, it is advantageous if the replacement cartridge has a ball check valve with a closing ball which is spring-loaded in the closing direction. The ball check valve is moved into its open position in a known manner by an actuator tappet when the cartridge is inserted into the receptacle recess or when it has already been inserted. The actuator tappet can be effectively located on the bottom of the receptacle recess and the ball check valve can be located on the end of the cartridge.

A replaceable dispenser can also be realized in the form of a separate detachable container which can be detachably connected to the end of the boring tool. Such a container can be hydraulically connected to a lubricant channel in the drill by a connecting tube on the shank-side end surface of the drill. The connecting tube can penetrate into the interior of the detachable container via an opening in the container. The connecting tube has a connecting channel which is hydraulically connected to the lubricant channel.

To assist the transport of lubricant, it is advantageous if the dispenser is pressurized. Such a pressurization can be advantageously realized by an expanding gas cushion. Such a gas cushion can either be present in the dispenser from the beginning, or can be generated only when needed. For example, the container can be separated by a separating piston into a lubricant chamber and a gas generation chamber. In the gas generation chamber, there is an electrolysis liquid into which a solid material can be introduced as needed, whereupon the solid material reacts with the electrolysis liquid, generating a gas.

It is also possible and advantageous, however, to realize the pressurization in the form of a spring-loaded compression piston. The boring tool can be used in any desired position both when the dispenser is pressurized and when capillary storage media are used. On all the exemplary embodiments described so far, the dispenser is preferably refillable. To guarantee this refilling capability, the dispenser is preferably provided with a check valve which can be unlocked from the outside. The check valve can be realized in the form of a spring-loaded ball check valve. Such a valve can be very easily unlocked by the discharge tube of a lubricant container. The dispenser can then be filled with lubricant.

In a boring tool as taught by the present invention, the lubricant channel is preferably realized in the form of a central channel, which channel extends coaxially to the longitudinal center axis of the drill. The channel, at least in the vicinity of the discharge openings, tapers toward the tip of the boring tool. This shape of the lubricant channel facilitates the flow of the lubricant, in particular the flow of a higher-viscosity lubricant. The closer a lubricant is to the working parts during operation, the less viscous it becomes. Accordingly, the cross section of the lubricant channel decreases as it comes closer to the working parts. A comparable effect can be achieved by a stepped boring, whereby the segment with the smallest diameter is located in the vicinity of the tip of the drill, which drill tip becomes hotter. Such a configuration is not absolutely necessary for the boring tool of the present invention. For example, there can also be several spiral lubricant channels, which channels run in a path which approximately follows the path of the chip flute.

On a tool holder for holding a boring tool as taught by the present invention, the dispenser is integrated into the tool holder. The dispenser is hydraulically connected to at least one internal lubricant channel in the boring tool when the boring tool is in place in the tool holder. The advantage of such an arrangement is primarily that, on account of the larger volume of the tool holder, a correspondingly larger reservoir can be created for the lubricant, which can therefore contain sufficient lubricant for longer periods of operation. This type of lubricant supply is also independent of the machine-side lubricant supply devices such as pumps, connecting lines, rotary transmission feed-throughs etc.

The dispenser located in a tool holder can, if necessary, be filled with higher or lower viscosity lubricants. To prevent a loss of low-viscosity lubricants, in particular when the drill is not in operation, it is advantageous if the hydraulic connection between the dispenser and the lubricant channel of the boring tool can be controlled by a check valve, in particular a check valve which is actuated by centrifugal force. A boring tool can therefore be replaced without the danger of lubricant escaping from the dispenser.

To assist in the transport of the lubricant, it is appropriate if the dispenser, such as the boring tool of the present invention, can be pressurized by an expandable gas cushion or by a spring-loaded compression piston. To assist in the transport of the lubricant, a capillary storage medium can also be located in the lubricant channel of the boring tool to transport the lubricant from the dispenser, in which there is preferably also a capillary storage medium, to the working parts of the boring tool. The dispenser which is integrated into the tool holder is preferably refillable.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the exemplary embodiments of a drill illustrated in the accompanying drawings, wherein.

DESCRIPTION OF THE PREFERRED EMBODIMENT

Figure 1:
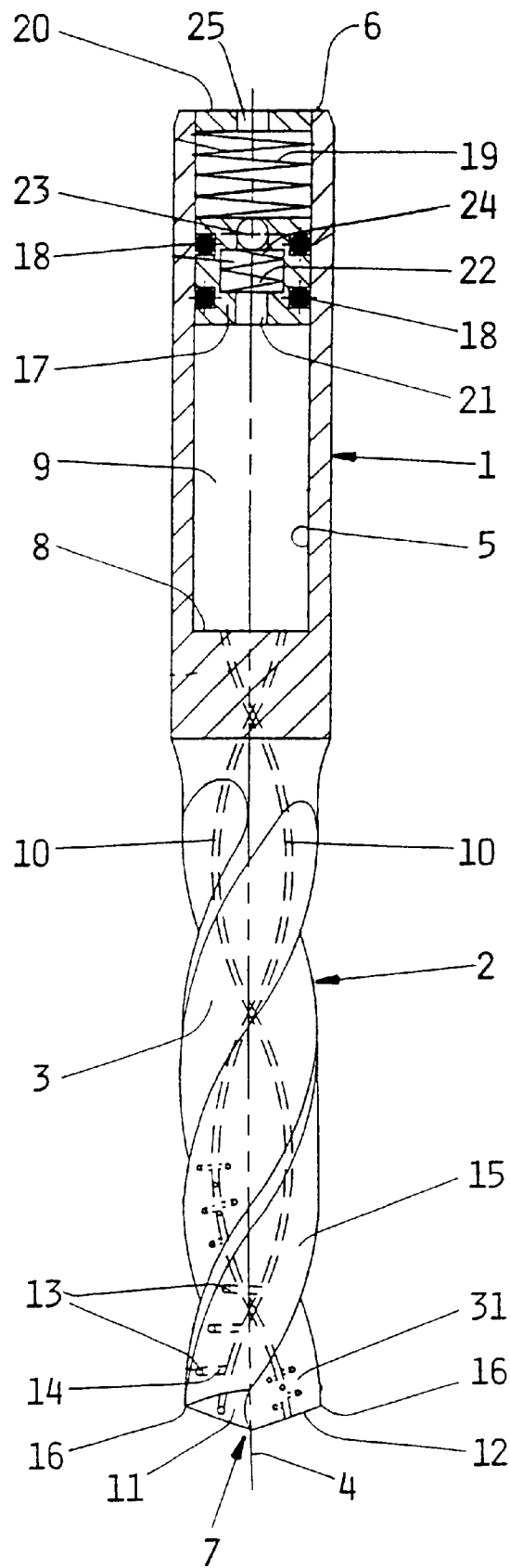
FIG. 1 shows a side view of a drill in longitudinal section, and in which drill the dispenser is formed by a recess in the drill shank.

FIG. 1 shows a drill as taught by the present invention which drill can be divided into a shank 1 and a cutter 2. The cutter 2 preferably has two chip flutes 3, which chip flutes 3 extend in a spiral pattern around a longitudinal center axis 4 of the drill. In the shank 1 of the drill there can be a recess 5, which recess 5 can be positioned coaxially around the longitudinal center axis 4. The recess 5 can also extend in the form of a blind hole from a shank-side end 6 of the drill toward a drill tip 7. The recess 5 preferably functions as a dispenser 9 to hold a lubricant. Two lubricant channels 10 can emerge in a bottom 8 of the dispenser 9 and can extend through to the drill tip 7. At that point, the lubricant channels 10 can emerge into flanks 11 of the major cutting edges of the drill. Preferably, the discharge openings of the lubricant channels 10 in the flanks 11 are plugged with a solder or an equivalent material. In the vicinity of the cutter 2, close to the drill tip 7, there can be a plurality of branch channels 14. The branch channels 14 can extend from the back 15 of the drill to the lubricant channel 10 corresponding to the back 15 of the drill. By means of these branch channels 14, which branch channels 14 can extend approximately radially out from the lubricant channel 10, during the cutting process, the lubricant is discharged by discharge openings 13 and reaches the current working parts, in this embodiment, on the back 15 of the drill and on chip faces 31 in the vicinity of the cutter edge 16 of the drill, as well as the adjacent areas toward the shank 1. The lubricant in the branch channels 14 can be transported outward by centrifugal force. The quantity of lubricant can be controlled by an appropriate selection of the cross sectional surface of the branch channels 14. It is appropriate if the diameter of the lubricant channels 10 decreases as the distance from the drill tip 7 increases. It is thereby guaranteed that the greater quantity of lubricant will reach the actual work site, namely in the vicinity of major cutting edges 12.

In another possible embodiment of the present invention, the diameter of the lubricant channels 10 can increase as the distance from the drill tip 7 increases.

The dispenser 9 can be pressurized. For this purpose, the dispenser 9 can have a compression piston 17, which compression piston 17 moves in the axial direction and is sealed by 0-rings 18 with respect to the inner wall of the dispenser 9. A compression spring 19 is supported on one hand on the shank-side end of the compression piston 17 and on the other hand on a cover plate 20. The cover plate 20 can be closed flush with the end 6 of the drill. As a result of the action of the compression spring 19, the lubricant enclosed between the bottom 8 of the dispenser 9 and the compression piston 17 is preferably pressed into the lubricant channels 10. The viscosity of the lubricant, the force of the compression spring 19 and the cross sectional areas both of the lubricant channels 10 and also of the branch channels 14 and the discharge openings 13 can be coordinated with one another so that with a specified viscosity of the lubricant at room temperature, practically no lubricant is pressed out of the branch channels 14. Only when the system heats up during the cutting process, i.e. when the viscosity of the lubricant decreases, does the lubricant become less viscous, and lubricant can then be transported outward through the branch channels 14.

The compression piston 17 is penetrated by a filling channel 21, in which filling channel 21 there is a ball valve. The ball valve can be pressurized in the closing direction by a compression spring 22. The closing element of this ball valve, namely a closing ball 23, is preferably pushed by the spring 22 against a valve seat which surrounds a filling opening 24. The dispenser 9 can thereby be closed. For refilling, a hollow needle can be introduced into the filling opening 24 by means of an insertion opening 25 in the cover plate 20, and the closing ball 23 can thereby be raised from its seat. In this manner, the dispenser 9 can be refilled with lubricant.

In another possible embodiment of the present invention, the dispenser 9 can be refilled by removing the cover plate 20. After the cover plate 20 has been removed the compression spring 19 and the compression piston 17 can be removed from the recess 5 of the shank 1. Lubricant can then be inserted into the dispenser 9 and the compression spring 19 and the compression piston 17 can be replaced in the recess 5. Finally, the cover plate 20 can be reconnected to the shank 1.

In yet another possible embodiment of the present invention, the dispenser 9 can be refilled through a refill opening (not shown) in the side of the shank 1. The refill opening can preferably be connected to the dispenser 9 to allow lubricant to be added to the dispenser 9. The refill opening can be sealed by a valve or cover to prevent any leakage of lubricant from the dispenser 9 while the drill is in operation.

Figure 2:
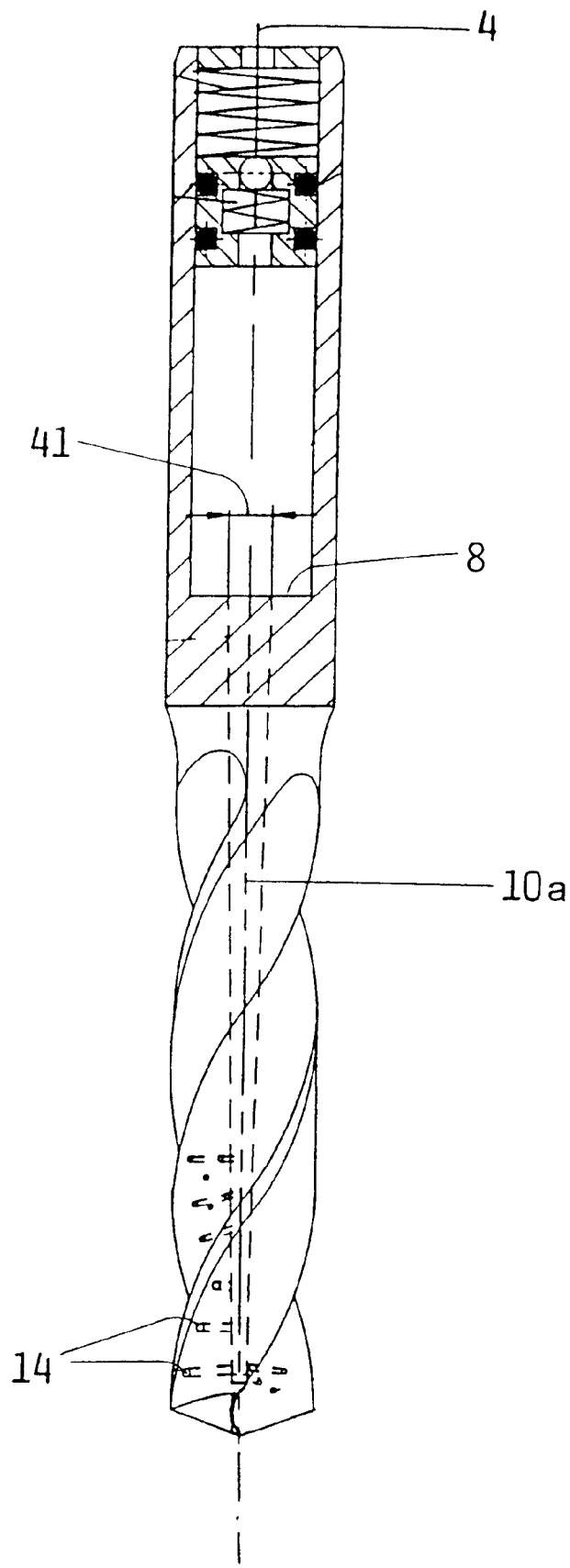
FIG. 2 shows a drill as illustrated in FIG. 1, but with a lubricant channel positioned coaxially and tapered toward the tip of the drill.
Figure 3:
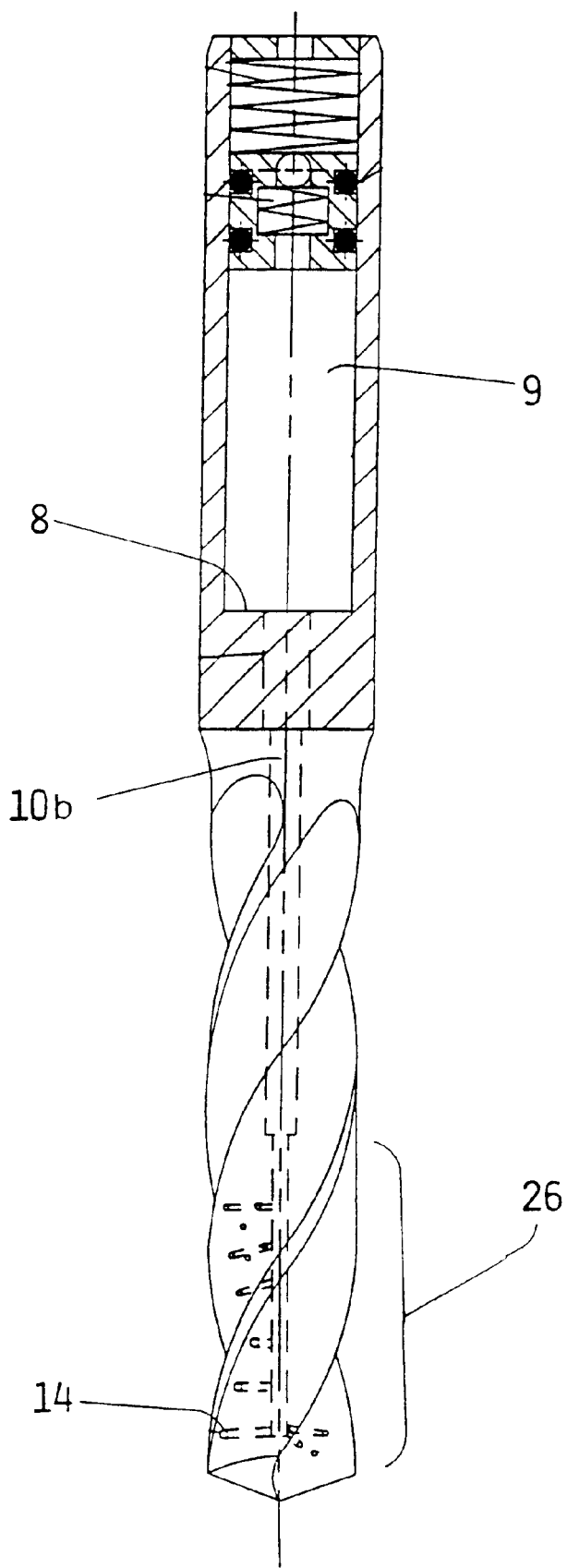
FIG. 3 shows a drill in a similar view as in FIG. 1, but with a central, coaxially positioned lubricant channel in the form of a stepped boring.

The drill illustrated in FIG. 2 differs from the drill illustrated in FIG. 1 essentially in that instead of two lubricant channels 10, there is a single lubricant channel 10a. The lubricant channel 10a can extend coaxially to the longitudinal center axis 4 of the drill. The lubricant channel 10a ends blind at some distance ahead of the drill tip 7, and extends in the direction of the shank 1 to the dispenser 9. The diameter 41 of the lubricant channel 10a is preferably greatest in the vicinity of the bottom 8 of the dispenser 9, and decreases continuously toward the drill tip 7. The taper of the lubricant channel 10a can be similar to the taper in the drill illustrated in FIG. 3. In this embodiment, the lubricant channel 10b from the dispenser 9 to the drill tip 7 does not taper continuously, but in steps. The lubricant channel 10b can therefore be realized in the form of a stepped boring. Overall, the lubricant channel 10b can have three areas with different diameters, whereby a first area having the largest diameter is adjacent to the bottom 8 of the dispenser 9 in the direction of the drill tip 7. Approximately at the line separating the shank 1 and the cutter 2, the lubricant channel 10b can become narrower. This area having the intermediate diameter can end approximately in the center of the cutter 2, and can be adjacent on the other side to an area 26 having an even smaller diameter. Branching off from this area 26 of the lubricant channel 10b are a plurality of branch channels 14 which emerge at discharge openings 13 in the back 15 of the drill and in the chip face 31. The flow of a highly-viscous lubricant can be facilitated by the shape of the lubricant channel 10a, 10b illustrated in FIGS. 2 and 3.

Figure 4:
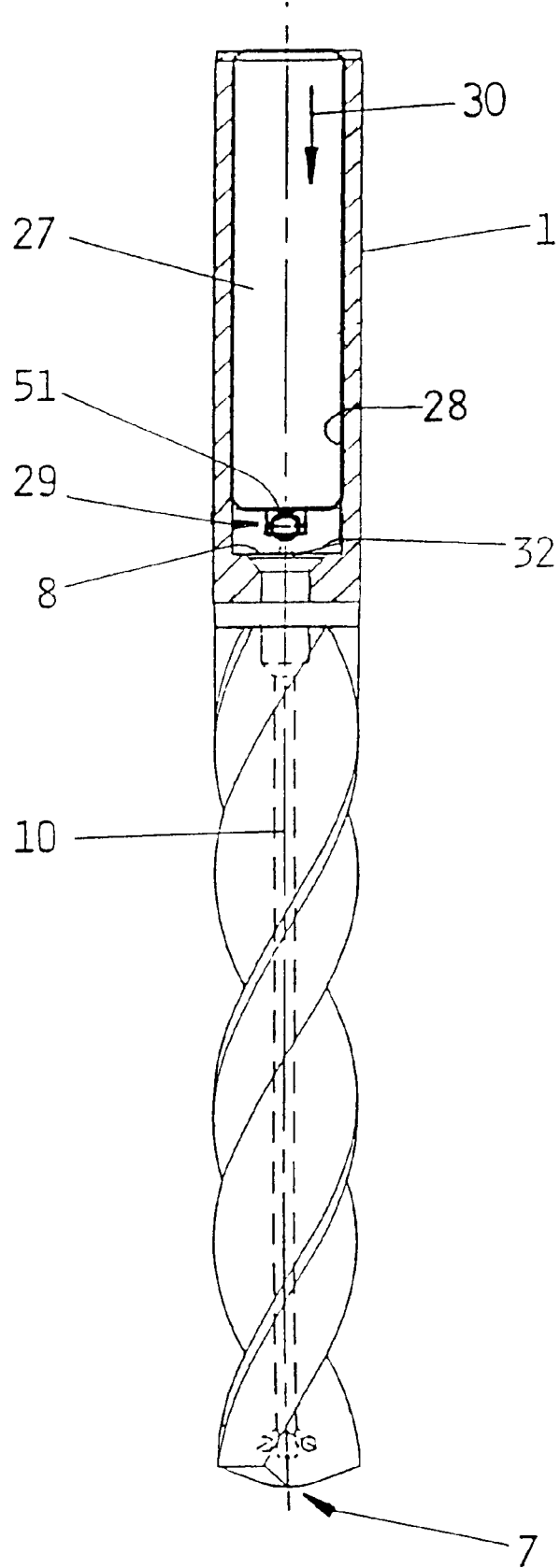
FIG. 4 shows a drill with a dispenser realized in the form of a replaceable cartridge.

FIG. 4 illustrates a drill having a replaceable dispenser. In this embodiment, the dispenser can be realized in the form of a replacement cartridge 27. The replacement cartridge 27 can be inserted into a receptacle recess 28, which receptacle recess 28 has a matching shape, in the shank 1. There can be a ball check valve 29 on the end of the replacement cartridge 27 facing the drill tip 7 when the cartridge 27 is in place. In the embodiment illustrated in FIG. 4, the cartridge 27 has not yet been inserted into the receptacle recess 28. When the cartridge 27 is preferably moved from the position illustrated in FIG. 4 in the direction indicated by the arrow 30, the ball 51 in the ball check valve 29 strikes an actuator tappet 32, which actuator tappet or pin 32 is located on the bottom 8 of the receptacle recess 28, the ball check valve 29 can thereby be moved into its open position, similar to a fountain pen. The lubricant can then travel into the receptacle recess 28 and into the lubricant channel 10.

In another possible embodiment of the present invention, a piston and spring could be built into the replacement cartridge 27 to add a pressurization force to the lubricant stored in the replacement cartridge 27. This pressurization force could assist the flow of lubricant from the replacement cartridge 27 to the lubricant channel 10.

Figure 5:
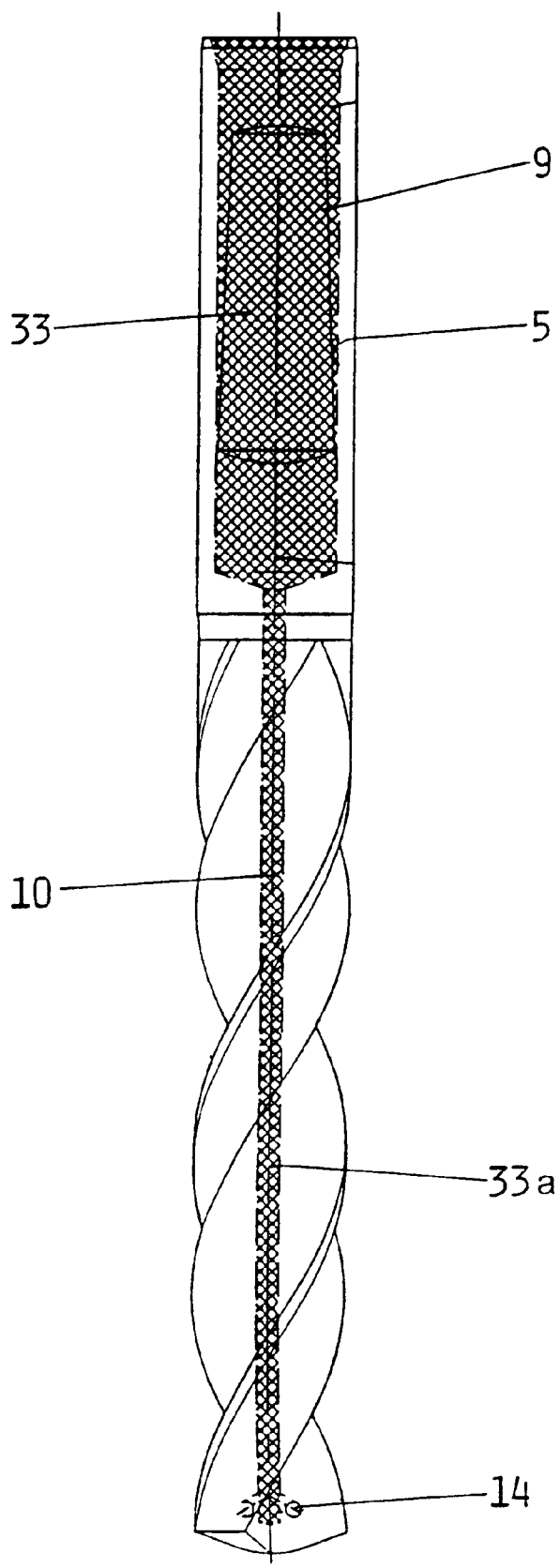
FIG. 5 shows a drill in which the dispenser and a central lubricant channel are filled with a porous or capillary storage medium.

In the embodiment illustrated in FIG. 5, there can be a central lubricant channel 10 which emerges into a dispenser 9. The dispenser 9, like the drill in FIG. 1, can be formed by a recess 5. The dispenser 9 and the lubricant channel 10 are preferably filled with a porous or capillary storage medium 33, 33a. The material of the capillary storage medium 33, 33a can thereby be something on the order of a sinter material, with sponge-like cavities connected with one another, or a fibrous material. A relatively low-viscosity lubricant can be contained in the capillary cavities of the storage medium 33. During operation of the drill illustrated in FIG. 5, the lubricant, which lubricant may have been liquefied by the heat of operation, can be discharged outward via the branch channel 14 by centrifugal force, and can be delivered to the working parts, i.e. approximately at the chip face 31. On account of the capillary suction action produced by the storage medium 33, the lubricant discharged at the working parts is continuously replaced. One of the major advantages of this embodiment is its technical simplicity. Neither a gas cushion nor any other pressure medium is required to transport the lubricant from the dispenser 9 to the working parts. The transport results solely from the capillary action of the storage medium, something like a felt-tip pen. The drill illustrated in FIG. 5 can also be operated in any desired position, without any reduction in its functionality or in the feed of the lubricant. It is also conceivable that there need not be any storage medium 33 in the dispenser 9 itself, and that the storage medium 33a in the lubricant channel 10 can extend, in the manner of a suction tube, through the interior of the dispenser 9.

In another possible embodiment of the present invention, the storage medium 33 can be connected to the storage medium 33a at either the sides of the recess 5 or in the center of the recess 5 about the longitudinal center axis 4. In addition, the storage medium could be refilled through a refill opening in either the shank-side end 6 or in the sides of the shank 1.

Figure 6:
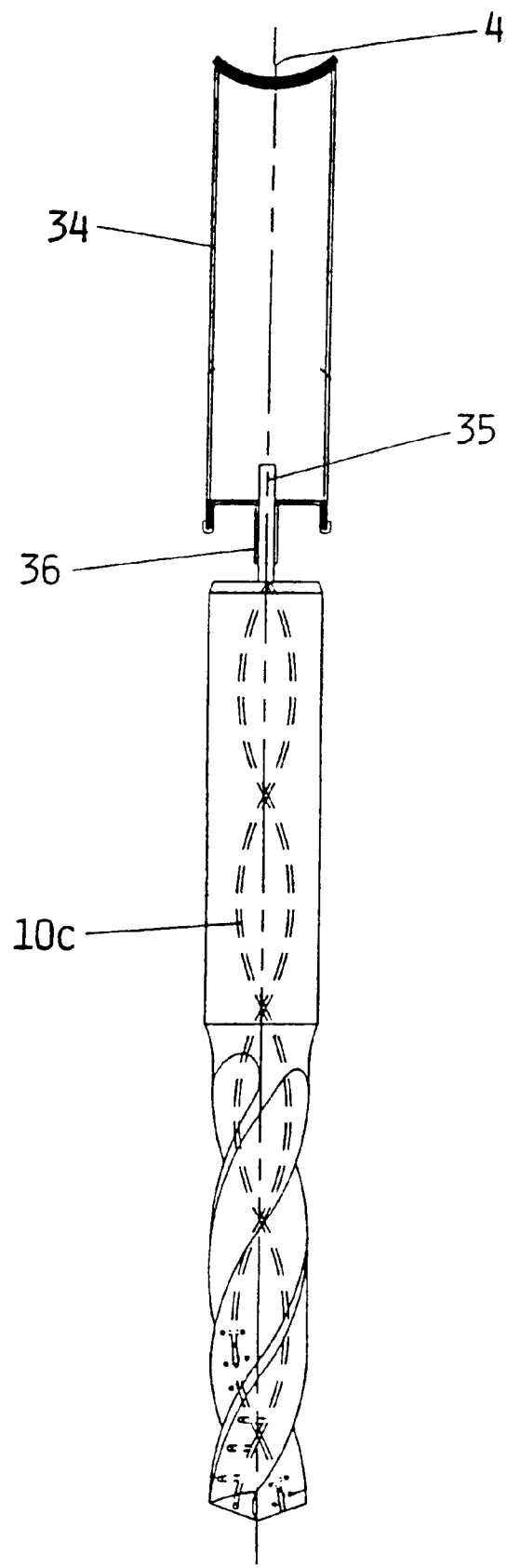
FIG. 6 shows a drill, to the end surface of which drill is connected a separate detachable container in the form of a dispenser.

In the drill illustrated in FIG. 6, the supply of lubricant is preferably not located inside the drill shank 1, but in a separate detachable reservoir 34, which reservoir 34 is preferably connected to the shank-side end 6 of the drill. For this purpose, the above-mentioned end 6 preferably has a connecting tube 35. The connecting tube 35 can extend in the direction of the longitudinal center axis 4 and can be penetrated by a connecting channel (not shown). The two spiral lubricant channels 10c empty into the connecting channel. The detachable reservoir 34, on its end facing the drill in the installed position, can have an opening which is encircled by a neck 36. In the installed position, the connecting tube 35 is preferably inside the neck 36, which creates a mechanical fastening of the detachable reservoir 34 to the drill or to the connecting tube 35.

In another possible embodiment of the present invention, a piston and spring could be built into the detachable reservoir 34 to add a pressurization force to the lubricant stored in the detachable reservoir 34. This pressurization force could assist the flow of lubricant from the detachable reservoir 34 through the connecting tube to the lubricant channels 10c.

Figure 7:
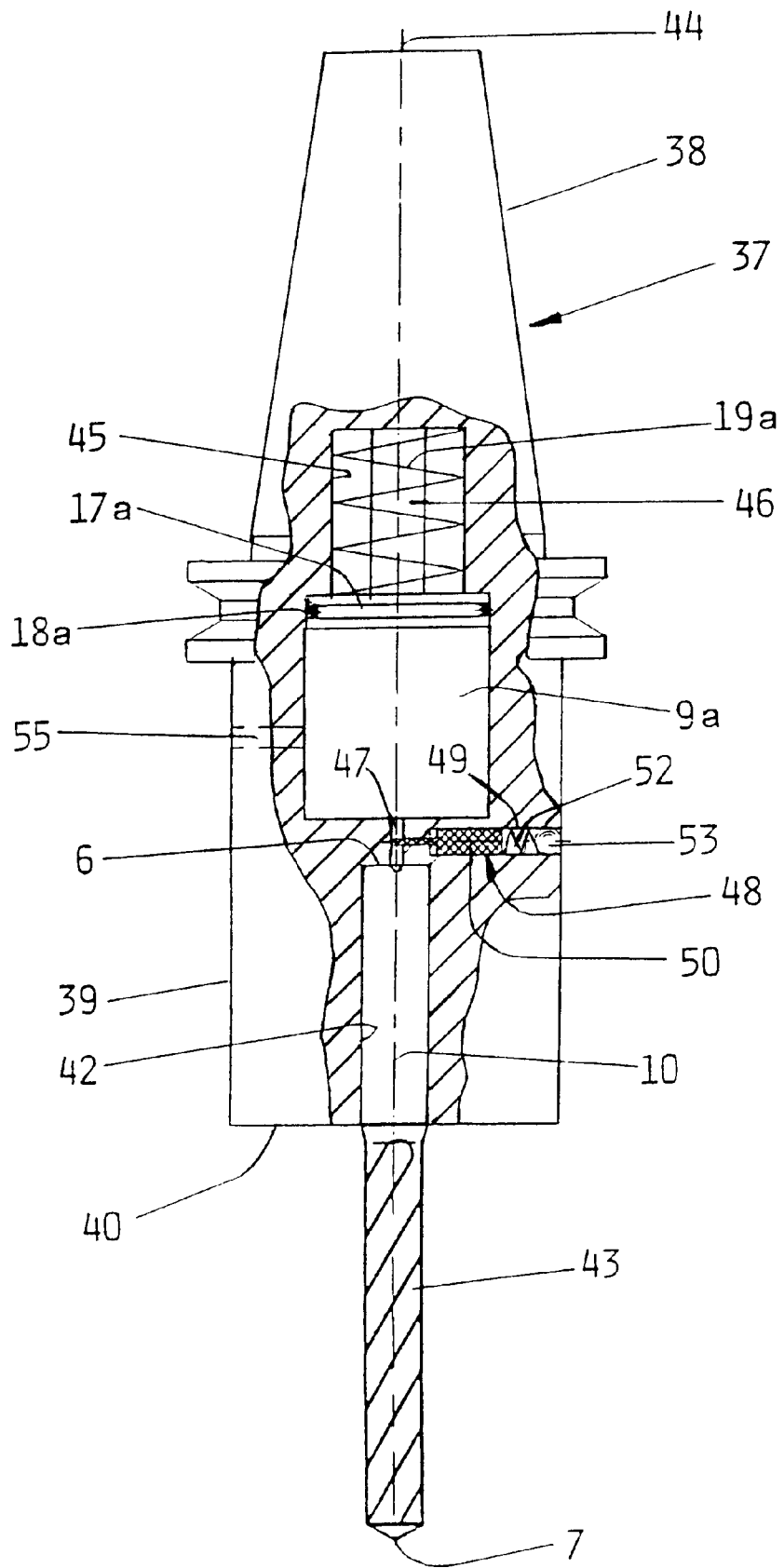
FIG. 7 shows a tool holder having an integrated dispenser, which dispenser can be pressurized by a spring-loaded piston.
Figure 8:
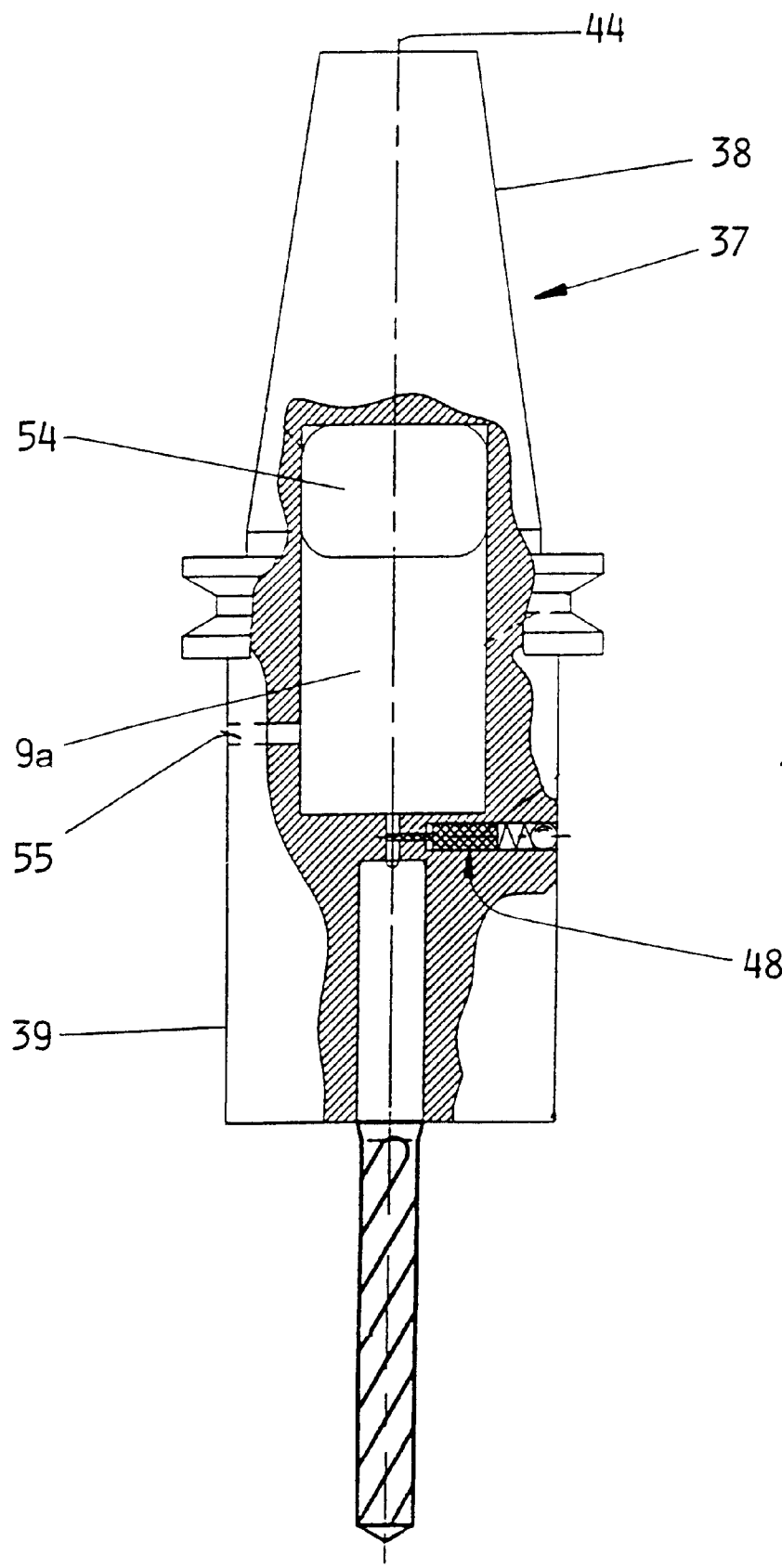
FIG. 8 shows a tool holder with an integrated dispenser, which dispenser can be pressurized by an expandable air cushion.

FIGS. 7 and 8 illustrate tool holders 37 as taught by the present invention. The tool holders 37 can have a conical retaining area 38, by means of which retaining area 38 the tool holders 37 can be inserted into a corresponding fixture of a tool or machine tool (not shown). A second area 39 adjacent to the conical area 38 is preferably realized in a cylindrical shape, and on its end 40 can have a locator boring 42 for a drill 43. Approximately in the central portion of the tool holder 37 and coaxial to a longitudinal center axis 44 of the tool holder 37, there is preferably a dispenser 9a. In the dispenser 9a there can be a compression piston 17a, which compression piston 17a can be sealed with respect to the inner wall of the dispenser 9a by a compression spring 19a. The compression spring 19a can be located in a spring chamber 45 which spring chamber 45 extends toward the conical retaining area 38 and can be connected to the dispenser 9a. Connected to the compression piston 17a is a piston rod 46 which projects in the direction of the longitudinal center axis 44 into the spring chamber 45.

In the drill 43 there is preferably a central lubricant channel 10 (not shown in FIG. 8), which lubricant channel 10 emerges on the shank-side end surface 6 of the drill 43. In the tool holder 37 there can be a connecting channel 47, which connecting channel 47 extends from the dispenser 9a to the end surface 6 or to the lubricant channel 10 which emerges in the end surface 6 of the drill 43. The connecting channel 47 is preferably closed by a check valve 48 which is actuated by centrifugal force. The connecting channel 47 can be realized as follows in one possible embodiment. In a radial locator boring 49 there can be a valve gate 50 which is pressurized in the closing direction by a compression spring 52. The compression spring 52 can be supported with its other end on a locking ball 53. The cutoff or check valve 48 can operate as follows in one possible embodiment. When the drill 43 rotates, the valve gate 50 is moved radially outward by centrifugal force, against the force of the compression spring 52. The valve gate 59 thereby exposes the cross section surface of the connecting channel 47, at least partly. The lubricant which is under pressure in the dispenser 9a is then preferably transported via the connecting channel 47 into the lubricant channel 10 and finally to the working parts in the vicinity of the drill tip 7.

The exemplary embodiment illustrated in FIG. 8 differs from the embodiment illustrated in FIG. 7 essentially in that the pressurization is produced by an expandable air cushion 54. In the two embodiments illustrated in FIGS. 7 and 8, there can be a reclosable refill opening 55, by means of which the dispenser 9a can be filled with lubricant.

In another possible embodiment of the present invention, the compression piston 17a can be sealed in the dispenser 9a by a seal or gasket 18a (see FIG. 7). The gasket 18a can be located around the entire circumference of the compression piston 17a to ensure an effective sealing of the compression piston 17a in the dispenser 9a.

One feature of the invention resides broadly in the method for supplying lubricating coolant to rotating cutting tools, in particular a drill, with a lubricant which is used for cooling and/or lubrication, in which the lubricant is contained in a reservoir which is connected directly or indirectly with the boring tool and functions as a dispenser 9 from which the lubricant is transported by means of at least one lubricant channel 10 and at least one discharge opening 13 in the boring tool to a working part to be lubricated and/or cooled.

Another feature of the invention resides broadly in the method characterized by a transport of the lubricant to the working parts by gravity.

Yet another feature of the invention resides broadly in the method characterized by a lubricant which is solid or highly viscous at room temperature and which liquefies at the temperatures encountered during cutting.

Still another feature of the invention resides broadly in the method characterized by a lubricant which is a fluid at room temperature, whereby the cross sectional area of the discharge opening and the viscosity of the lubricant are coordinated with one another so that the lubricant does not escape from the discharge openings when the boring tool is not being used or is at room temperature.

A further feature of the invention resides broadly in the method characterized by the fact that the transport of the lubricant to the working parts of the boring tool takes place by means of a capillary fluid transport device.

Another feature of the invention resides broadly in the method characterized by the fact that the transport of the lubricant to the working parts of the boring tool is accomplished or assisted by a pressurization of the dispenser 9.

Yet another feature of the invention resides broadly in the method characterized by the fact that the quantity of lubricant fed to the working parts is controlled by means of the size of the discharge openings.

Still another feature of the invention resides broadly in the method characterized by the fact that the dispenser 9 is integrated into the boring tool.

A further feature of the invention resides broadly in the method characterized by the fact that the dispenser 9 is a separate reservoir which can be connected to the boring tool.

Another feature of the invention resides broadly in the method characterized by the fact that the dispenser is integrated into a tool holder which holds the boring tool.

Yet another feature of the invention resides broadly in the boring tool, in particular a drill, to carry out the method with a shank 1, a cutter 2 and at least one internal lubricant channel 10 characterized by at least one reservoir which functions as a dispenser 9 for a lubricant, and is directly or indirectly connected mechanically to the boring tool and hydraulically to the at least one lubricant channel 10.

Still another feature of the invention resides broadly in the boring tool characterized by the fact that the dispenser 9 is formed by a recess 5 in the shank 2 of the boring tool, which recess 5 is in the form of a blind hole which extends from the shank-side end surface 6 of the boring tool toward the cutter 2.

A further feature of the invention resides broadly in the boring tool characterized by the fact that the dispenser 9 is a replaceable cartridge 27 which lies in a receptacle recess 28 in the shank 1 of the boring tool.

Another feature of the invention resides broadly in the boring tool characterized by the fact that the replaceable cartridge 27 has a ball check valve 29 located on its one end with a closing ball which is spring-loaded in the closing direction, and which when a replaceable cartridge 27 is inserted in the receptacle recess 28, is held in its open position by an actuator lever 32 which is located on the bottom 8 of the receptacle recess 28.

Yet another feature of the invention resides broadly in the boring tool characterized by a separate detachable reservoir 34 which is detachably connected to the shank-side end 6 of the boring tool and functions as a dispenser 9.

Still another feature of the invention resides broadly in the boring tool characterized by a connecting tube 35 which can be inserted into an opening of the detachable reservoir 34, and is penetrated by a connecting channel which is hydraulically connected to a lubricant channel 10.

A further feature of the invention resides broadly in the boring tool characterized by the fact that the dispenser 9 is pressurized.

Another feature of the invention resides broadly in the boring tool characterized by the fact that an expandable gas cushion 54 is located in or can be generated in the dispenser 9.

Yet another feature of the invention resides broadly in the boring tool characterized by a pressurization in the form of a spring-loaded compression piston 17 located in the dispenser 9.

Still another feature of the invention resides broadly in the boring tool characterized by the fact that in the dispenser 9 there is a capillary storage medium 33 which works together with a capillary storage medium 33a in a lubricant channel 10a.

A further feature of the invention resides broadly in the boring tool characterized by a refillable dispenser 9.

Another feature of the invention resides broadly in the boring tool characterized by a filling channel 21 which extends through the compression piston 17, with a check valve which can be unlocked from outside and is located in the filling channel 21.

Yet another feature of the invention resides broadly in the boring tool characterized by at least one lubricant channel 10, from which at least one small-diameter branch channel 14 branches off which emerges at a discharge opening 13 at a working part of the boring tool, whereby the branch channel and/or the discharge opening 13 have/has a smaller flow cross section than the lubricant channel.

Still another feature of the invention resides broadly in the boring tool characterized by a central lubricant channel 10a which runs coaxially to the longitudinal center axis 4 of the boring tool and which tapers toward the tip of the boring tool, at least in the vicinity of discharge openings 13.

A further feature of the invention resides broadly in the boring tool characterized by a central lubricant channel 10b which runs coaxially to the longitudinal center axis 4 of the boring tool, and is realized in the manner of a stepped boring introduced from the shank end, whereby the branch channels 14 branch off from a smaller-diameter area 26 near the drill tip 7 of the boring tool.

Another feature of the invention resides broadly in the boring tool characterized by two spiral lubricant channels 10c with a path which corresponds to the path of the chip flutes 3 which are present in the cutter 2.

Yet another feature of the invention resides broadly in the tool holder for holding a boring tool, characterized by an integrated dispenser 9a for a lubricant, whereby the dispenser, when the boring tool 43 is held in the tool holder, is hydraulically connected to at least one internal lubricant channel 10 of the boring tool.

Still another feature of the invention resides broadly in the tool holder characterized by the fact that the hydraulic connection between the dispenser 9 and the lubricant channel 10 can be controlled by means of a check valve 48 which is actuated by centrifugal force.

A further feature of the invention resides broadly in the tool holder characterized by the fact that the dispenser 9 is pressurized.

Another feature of the invention resides broadly in the tool holder characterized by the fact that an expandable gas cushion 54 is present in or can be generated in the dispenser 9a.

Yet another feature of the invention resides broadly in the tool holder characterized by a pressurization in the form of a spring-loaded compression piston 17a which is located in the dispenser 9.

Still another feature of the invention resides broadly in the tool holder characterized by the fact that in the dispenser 9a there is a capillary storage medium 33 which works together with a capillary storage medium 33a in a lubricant channel 30 of a boring tool which is held in the tool holder.

A further feature of the invention resides broadly in the tool holder characterized by a refillable dispenser 9.

Another feature of the invention resides broadly in the tool holder characterized by a refill channel 55 which extends from the outside of the tool holder into the interior of the dispenser 9a.

Some examples of drills and related components which may possibly be utilized or adapted for use in the context of the present invention may be disclosed in the following U.S. Pat. Nos. 5,377,773 to Tibbitts on Jan. 3, 1995; 5,380,133 to Schimmer on Jan. 10, 1995; 5,383,751 to Wheetley et al. on Jan. 24, 1995; 5,388,649 to Ilomaki on Feb. 14, 1995; 5,400,546 to Christian et al. on Mar. 28, 1995; 5,415,500 to Delangis et al. on May 16, 1995; 5,417,296 to Murdock on May 23, 1995; 5,421,423 to Huffstutler on Jun. 16, 1995; 5,425,288 to Evans on Jun. 20, 1995; 5,433,279 to Tessari et al. on Jul. 18, 1995; 5,441,119 to Head on Aug. 15, 1995; 5,442,979 to Hsu on Aug. 22, 1995; 5,449,047 to Schivley, Jr. on Sep. 12, 1995; 5,452,971 to Nevills on Sep. 26, 1995; 5,458,210 to Sollami on Oct. 17, 1995; 5,469,926 to Lessard on Nov. 28, 1995; and 5,474,139 to Odendahl et al. on Dec. 12, 1995.

Some examples of tool holders and related components which may possibly be utilized or adapted for use in the context of the present invention may be disclosed in the following U.S. Pat. Nos. 5,378,091 to Nakamura on Jan. 3, 1995; 5,382,122 to Mihic on Jan. 17, 1995; 5,388,487 to Danielsen on Feb. 14, 1995; 5,388,936 to Mihic on Feb. 14, 1995; 5,391,027 to Green on Feb. 21, 1995; 5,417,131 to Robertson on May 23, 1995; 5,427,484 to Galli on Jun. 27, 1995; and 5,460,066 to Dennstedt on Oct. 24, 1995.

Some examples of lubricants which may possibly be utilized or adapted for use in the context of the present invention may be disclosed in the following U.S. Pat. Nos. 5,378,379 to Bershas on Jan. 3, 1995; 5,388,631 to Suganuma et al. on Feb. 14, 1995; 5,399,274 to Marcus on Mar. 21, 1995; 5,415,791 to Chou et al. on May 16, 1995; 5,417,869 to Giacobbe et al. on May 23, 1995; 5,419,413 to Nakata et al. on May 30, 1995; 5,427,698 to Hirokawa et al. on Jun. 27, 1995; and 5,477,934 to Strand on Dec. 26, 1995.

Some examples of porous storage media which may possibly be utilized or adapted for use in the context of the present invention may be disclosed in the following U.S. Pat. Nos. 5,242,111 to Nakoneczny on Sep. 7, 1993; 5,362,167 to Loftin on Nov. 8, 1994; 5,384,264 to Chen et al. on Jan. 24, 1995; 5,433,545 to Keil on Jul. 18, 1995; 5,445,746 to Lee on Aug. 29, 1995; and 5,470,904 to Loftin et al. on Nov. 28, 1995.

The following U.S. patent applications Ser. No. 08/836,326 having inventor Ulrich Krenzer filed on May 9, 1997; Ser. No. 08/849,518 having inventor Ulrich Krenzer filed on Jun. 9, 1997; and Ser. No. 08/836,144 having inventor Ulrich Krenzer filed on Jun. 9, 1997 are hereby incorporated by reference as if set forth in its entirety herein.

U.S. patent application, Ser. No. 09/005,271, filed on Jan. 9, 1998, having inventors Dirk Kammermeier and Bernhard Borschert, having the title "Drill with Cooling-Lubricant Channel" and claiming priority from Federal Republic of Germany Patent Application No. 295 11 430.4, filed on Jul. 14, 1995, Federal Republic of Germany Patent Application No. 295 12 745.7, filed on Aug. 8, 1995, Federal Republic of Germany Patent Application No. 296 02 997.1, filed on Feb. 21, 1996, and International Application No. PCT/EP96/03083, filed on Jul. 13, 1996, is hereby incorporated by reference as if set forth in its entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 295 12 745.7, filed on Aug. 8, 1995, and 296 02 997.1, filed on Feb. 21, 1996, having inventors Dirk Kammermeier and Bernhard Borschert, and DE-OS 295 12 745.7, filed on Aug. 8, 1995, and 296 02 997.1, filed on Feb. 21, 1996 and DE-PS 295 12 745.7, filed on Aug. 8, 1995, and 296 02 997.1, filed on Feb. 21, 1996 and International Application No. PCT/EP96/03489, filed on Aug. 7, 1996, and published as WO 97/05987 on Feb. 20, 1997, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A drill having a longitudinal axis, said drill comprising:
   a shank portion;
   a cutter portion;
   said cutter portion being disposed to extend from said shank portion;
   said cutter portion comprising a drill tip to drill a hole in a material to be drilled;
   said drill tip being disposed opposite to said shank portion;
   at least one channel;
   said at least one channel being configured and disposed to extend at least along said cutter portion in a substantially longitudinal direction;
   said at least one channel being configured to permit flow of lubricant through said drill;
   at least one reservoir being configured to receive and contain lubricant;
   said at least one reservoir being disposed within said drill;
   said at least one reservoir being operatively connected hydraulically to said at least one channel to permit lubricant in said at least one reservoir to enter said at least one channel;
   said cutter portion comprising at least one chip flute;
   said at least one chip flute being configured and disposed to remove chips generated by said drill tip;
   said at least one chip flute being disposed to spiral from said drill tip to said shank portion about the longitudinal axis;
   said cutter portion comprising at least one opening;
   said at least one opening being disposed adjacent to said drill tip;
   said at least one channel being operatively connected to said at least one opening to permit discharge of lubricant from said cutter portion;
   said shank portion comprising an end;
   said end of said shank portion being disposed opposite said cutter portion;
   said at least one reservoir comprising an arrangement to permit refilling of said at least one reservoir with lubricant;
   said lubricant contained in said at least one reservoir being substantially pressurized;
   said drill comprising a dispenser;
   said dispenser being configured and disposed to exert a force on said lubricant in said at least one reservoir; and
   said dispenser comprising one of a) and b):
   a) an expandable gas cushion; and
      said expandable gas cushion being configured and disposed to apply a pressure to said lubricant contained in said at least one reservoir; and
   b) a piston;
      a spring; and
      said piston and said spring together being configured and disposed to apply a pressure to said lubricant contained in said at least one reservoir.

2. The drill according to claim 1, wherein:
   said lubricant contained in said at least one reservoir is configured to be highly viscous at room temperature and less viscous at an operating temperature of said drill;

said at least one channel comprises two channels;

each of said two channels is configured and disposed to spiral about the longitudinal axis corresponding to said at least one chip flute;

said drill comprises at least one branch passage;

said at least one branch passage is disposed to connect said at least one opening and said two channels;

each of said two channels has a first diameter;

said at least one branch passage has a second diameter;

the second diameter is substantially smaller than the first diameter;

said at least one opening has a third diameter;

the third diameter is substantially smaller than the first diameter;

said dispenser comprises said piston and said spring;

said piston comprises a filling channel to permit passage of lubricant between said end of said shank portion and said at least one reservoir;

said piston comprises a check valve;

said check valve is disposed in said filling channel; and said check valve is configured and disposed to be opened from said end of said shank portion by an apparatus to supply lubricant.

3. The drill according to claim 1, wherein:

said lubricant contained in said at least one reservoir is configured to be highly viscous at room temperature and less viscous at an operating temperature of said drill;

said at least one channel comprises one channel;

said channel is disposed coaxial to the longitudinal axis of said drill;

said channel comprises a tapered portion;

said tapered portion of said channel has a first diameter at an end of said channel disposed adjacent to said drill tip;

said tapered portion of said channel is disposed adjacent to said at least one opening;

said drill comprises at least one branch passage;

said at least one branch passage is disposed to connect said at least one opening and said tapered portion of said channel;

said at least one branch passage has a second diameter;

the second diameter is smaller than the first diameter;

said at least one opening has a third diameter;

the third diameter is smaller than the first diameter;

said dispenser comprises said piston and said spring;

said piston comprises a filling channel to permit passage of lubricant between said end of said shank portion and said at least one reservoir;

said piston comprises a check valve;

said check valve is disposed in said filling channel; and said check valve is configured and disposed to be opened from said end of said shank portion by an apparatus to supply lubricant.

4. The drill according to claim 1, wherein:

said lubricant contained in said at least one reservoir is configured to be highly viscous at room temperature and less viscous at an operating temperature of said drill;

said at least one channel comprises one channel;

said channel is disposed coaxial to the longitudinal axis of said drill;

said channel comprises a stepped boring;

said stepped boring comprises a plurality of segments;

each segment of said plurality of segments has a different diameter, the diameter of a segment of said plurality of segments adjacent to said shank portion is substantially larger than the diameter of a segment of said plurality of segments adjacent to said drill tip;

said drill comprises at least one branch passage;

said at least one branch passage is disposed to connect said at least one opening and said segment of said plurality of segments disposed immediately adjacent to said drill tip;

said at least one branch passage has a diameter;

the diameter of said at least one branch passage is smaller than the diameter of said segment of said plurality of segments disposed immediately adjacent to said drill tip;

said at least one opening has a diameter;

the diameter of said at least one opening is smaller than the diameter of said segment of said plurality of segments disposed immediately adjacent to said drill tip;

said dispenser comprises said piston and said spring;

said piston comprises a filling channel to permit passage of lubricant between said end of said shank portion and said at least one reservoir;

said piston comprises a check valve;

said check valve is disposed in said filling channel; and said check valve is configured and disposed to be opened from said end of said shank portion by an apparatus to supply lubricant.

5. A drill having a longitudinal axis, said drill comprising:

a shank portion;

a cutter portion;

said cutter portion being disposed to extend from said shank portion;

said cutter portion comprising a drill tip to drill a hole in a material to be drilled;

said drill tip being disposed opposite to said shank portion;

at least one channel;

said at least one channel being configured and disposed to extend at least along said cutter portion in a substantially longitudinal direction;

said at least one channel being configured to permit flow of lubricant through said drill;

at least one reservoir being configured to receive and contain lubricant;

said at least one reservoir being disposed within said drill;

said at least one reservoir being operatively connected hydraulically to said at least one channel to permit lubricant in said at least one reservoir to enter said at least one channel;

said cutter portion comprising at least one chip flute;

said at least one chip flute being configured and disposed to remove chips generated by said drill tip;

said at least one chip flute being disposed to spiral from said drill tip to said shank portion about the longitudinal axis;

said cutter portion comprising at least one opening;

said at least one opening being disposed adjacent to said drill tip;

said at least one channel being operatively connected to said at least one opening to permit discharge of lubricant from said cutter portion;

said shank portion comprising an end;

said end of said shank portion being disposed opposite said cutter portion;

said at least one reservoir comprising an arrangement to permit refilling of said at least one reservoir with lubricant;

said drill comprising a capillary storage medium;

said capillary storage medium being disposed in at least one of said at least one reservoir and said at least one channel;

said drill comprising at least one branch passage;

said at least one branch passage being disposed to connect said at least one opening and said at least one channel;

said at least one channel having a first diameter;

said at least one branch passage having a second diameter;

the second diameter being substantially smaller than the first diameter;

said at least one opening having a third diameter; and the third diameter being substantially smaller than the first diameter.

6. A drill having a longitudinal axis, said drill comprising;

a shank portion;

a cutter portion;

said cutter portion being disposed to extend from said shank portion;

said cutter portion comprising a drill tip to drill a hole in a material to be drilled;

said drill tip being disposed opposite to said shank portion;

at least one channel;

said at least one channel being configured and disposed to extend at least along said cutter portion in a substantially longitudinal direction;

said at least one channel being configured to permit flow of lubricant through said drill;

at least one reservoir being configured to receive and contain lubricant;

said at least one reservoir being disposed within said drill;

said at least one reservoir being operatively connected hydraulically to said at least one channel to permit lubricant in said at least one reservoir to enter said at least one channel;

said cutter portion comprising at least one chip flute;

said at least one chip flute being configured and disposed to remove chips generated by said drill tip;

said at least one chip flute being disposed to spiral from said drill tip to said shank portion about the longitudinal axis;

said cutter portion comprising at least one opening;

said at least one opening being disposed adjacent to said drill tip;

said at least one channel being operatively connected to said at least one opening to permit discharge of lubricant from said cutter portion;

said shank portion comprising an end;

said end of said shank portion being disposed opposite said cutter portion;

said drill comprising a cartridge;

said at least one reservoir being disposed in said cartridge; and said cartridge being configured to be insertable into said drill and removable from said drill.

7. The drill according to claim 6, wherein:

said cartridge comprises a valve arrangement to permit passage of lubricant from said at least one reservoir;

said valve arrangement is disposed adjacent to said at least one channel upon said cartridge being inserted into said drill;

said valve arrangement has an open position and a closed position;

said valve arrangement comprises a ball and a spring;

said spring is configured and disposed to tension said ball to close said valve arrangement;

said shank portion comprises a lever;

said lever is configured and disposed to move said ball against the tension of said spring to open said valve arrangement upon said cartridge being inserted into said drill;

said drill comprises at least one branch passage;

said at least one branch passage is disposed to connect said at least one opening and said at least one channel;

said at least one channel has a first diameter;

said at least one branch passage has a second diameter;

the second diameter is substantially smaller than the first diameter;

said at least one opening has a third diameter; and the third diameter is substantially smaller than the first diameter;

said lubricant contained in said at least one reservoir is substantially pressurized; and said cartridge comprises one of a) and b):
  a) an expandable gas cushion; and
    said expandable gas cushion being configured and disposed to apply a pressure to said lubricant contained in said at least one reservoir; and
  b) a piston;
    a spring; and
    said piston and said spring together are configured and disposed to apply a pressure to said lubricant contained in said at least one reservoir.

8. An apparatus to hold a drill in an operating position, the drill having a shank portion, a cutter portion, the cutter portion being disposed to extend from the shank portion, the cutter portion comprising a drill tip to drill a hole in a material to be drilled, the drill tip being disposed opposite to the shank portion, at least one channel, the at least one channel being configured and disposed to extend at least along the cutter portion in a substantially longitudinal direction; and the at least one channel being configured to permit flow of lubricant through the drill, said holding apparatus comprising:

a dispenser being configured to contain a lubricant;

said dispenser being integral with and disposed at said holding apparatus;

an arrangement to hydraulically connect said dispenser and the at least one channel of the drill upon the drill being held in the operating position by said holding apparatus;

said connecting arrangement comprising a valve arrangement;

said valve arrangement being configured and disposed to be actuated by centrifugal force to control the flow of lubricant from said dispenser to the at least one channel of the drill; and said lubricant contained in said dispenser being pressurized.

9. The holding apparatus according to claim 8, wherein:

said dispenser is configured and disposed to be refillable with lubricant;

said holding apparatus comprising a refill channel to permit passage of lubricant between said dispenser and a position exterior from said holding apparatus;

said refill channel is configured and disposed to extend between said dispenser and an exterior surface of said holding apparatus;

said dispenser comprises an expandable gas cushion; and said expandable gas cushion being configured and disposed to apply a pressure to said lubricant contained in said dispenser.

10. The holding apparatus according to claim 8, wherein:

said dispenser is configured and disposed to be refillable with lubricant;

said holding apparatus comprising a refill channel to permit passage of lubricant between said dispenser and a position exterior from said holding apparatus;

said refill channel is configured and disposed to extend between said dispenser and an exterior surface of said holding apparatus;

said dispenser comprises a piston and spring; and said piston and said spring together are configured and disposed to apply a pressure to said lubricant contained in said dispenser.

11. A method for supplying lubricant to a drill arrangement, the drill arrangement having a shank portion, a cutter portion, the cutter portion being disposed to extend from the shank portion, the cutter portion comprising a drill tip to drill a hole in a material to be drilled, the drill tip being disposed opposite to the shank portion, at least one channel, the at least one channel being configured and disposed to extend at least along the cutter portion in a substantially longitudinal direction, the at least one channel being configured to permit flow of lubricant through the drill arrangement, a dispenser, the dispenser being disposed adjacent to the shank portion, the cutter portion comprising at least one opening, the at least one opening being disposed adjacent to the drill tip, and the at least one channel being operatively connected to the at least one opening to permit discharge of lubricant from the cutter portion, said method comprising the steps of:

providing a lubricant to cool and lubricate the drill arrangement during operation of the drill arrangement;

storing the lubricant in the dispenser;

connecting operatively the dispenser storing the lubricant to the at least one channel;

transporting the lubricant through the at least one channel and the at least one opening to an area substantially adjacent the drill tip to at least one of cool and lubricate the drill arrangement during operation of the drill arrangement;

said step of transporting the lubricant comprising one of a), b) and c):

a) transporting the lubricant through the at least one channel and the at least one opening by gravity;

b) transporting the lubricant through the at least one channel and the at least one opening by means of a capillary transport device; and c) transporting the lubricant through the at least one channel and the at least one opening by pressurization of the dispenser;

said step of providing a lubricant comprising providing a lubricant which is one of: solid or highly viscous at room temperature and is substantially liquified at an operating temperature of the drill arrangement;

coordinating the cross-section of the at least one opening and the viscosity of the lubricant to limit leakage of the lubricant from the at least one opening when the drill arrangement is not in operation;

said dispenser being one of d), e) and f):
  d) disposed in a recess in the shank portion;
  e) disposed separate and a distance from the shank portion; and
  f) disposed in the drill arrangement apart from the shank portion; and the at least one opening being sized to control the amount of lubricant passing through the at least one opening during operation of the drill arrangement.

12. A drill having a longitudinal axis, said drill comprising:

a shank portion;

a cutter portion;

said cutter portion being disposed to extend from said shank portion;

said cutter portion comprising a drill tip to drill a hole in a material to be drilled;

said drill tip being disposed opposite to said shank portion;

said shank portion comprising an end;

said end of said shank portion being disposed opposite said cutter portion;

at least one channel;

said at least one channel being configured and disposed to extend at least along said cutter portion in a substantially longitudinal direction;

said at least one channel being configured to permit flow of lubricant through said drill arrangement;

at least one reservoir being configured to receive and contain lubricant;

said at least one reservoir comprising a device to selectively both mechanically connect and operatively hydraulically connect said at least one reservoir to said at least one channel; and said at least one reservoir being detachably connectable to said end of said shank portion.

13. The drill arrangement according to claim 12, wherein:

said cutter portion comprises at least one chip flute;

said at least one chip flute is configured and disposed to remove chips generated by said drill tip;

said at least one chip flute is disposed to spiral from said drill tip to said shank portion about the longitudinal axis;

said cutter portion comprises at least one opening;

said at least one opening is disposed adjacent to said drill tip; and said at least one channel is operatively connected to said at least one opening to permit discharge of lubricant from said cutter portion.

14. The drill according to claim 13, wherein:

said at least one reservoir comprises an opening;

said at least one reservoir comprises a tube;

said tube is disposed in said opening of said at least one reservoir to permit passage of lubricant from said at least one reservoir;

said at least one channel comprises two channels;

each of said two channels is disposed to further extend from said cutter portion along said shank portion to said end of said shank portion;

each of said two channels is configured and disposed to spiral about the longitudinal axis;

said drill comprises a connecting channel;

said connecting channel is disposed to connect said tube and said two channels to permit passage of lubricant from said at least one reservoir to said two channels;

said drill comprises at least one branch passage;

said at least one branch passage is disposed to connect said at least one opening and said two channels;

each of said two channels has a first diameter;

said at least one branch passage has a second diameter;

the second diameter is substantially smaller than the first diameter;

said at least one opening has a third diameter;

the third diameter is substantially smaller than the first diameter;

said lubricant contained in said at least one reservoir is substantially pressurized; and said drill comprises one of a) and b):
  a) an expandable gas cushion; and
    said expandable gas cushion being configured and disposed to apply a pressure to said lubricant contained in said at least one reservoir; and
  b) a piston;
    a spring; and
    said piston and said spring together are configured and disposed to apply a pressure to said lubricant contained in said at least one reservoir.

15. An apparatus to hold a drill in an operating position, the drill having a shank portion, a cutter portion, the cutter portion being disposed to extend from the shank portion, the cutter portion comprising a drill tip to drill a hole in a material to be drilled, the drill tip being disposed opposite to the shank portion, at least one channel, the at least one channel being configured and disposed to extend at least along the cutter portion in a substantially longitudinal direction, the at least one channel being configured to permit flow of lubricant through the drill, and the drill having a capillary storage medium disposed in the at least one channel, said holding apparatus comprising:

a dispenser being configured to contain a lubricant;

said dispenser being integral with and disposed at said holding apparatus;

an arrangement to hydraulically connect said dispenser and the at least one channel of the drill upon the drill being held in the operating position by said holding apparatus;

said dispenser comprising a capillary storage medium; and said capillary storage medium of said dispenser being configured and disposed to work in conjunction with the capillary storage medium of the at least one channel to permit passage of lubricant from said dispenser to the cutter portion of the drill.

16. The holding apparatus according to claim 15, wherein:

said dispenser is configured and disposed to be refillable with lubricant;

said holding apparatus comprising a refill channel to permit passage of lubricant between said dispenser and a position exterior from said holding apparatus; and said refill channel is configured and disposed to extend between said dispenser and an exterior surface of said holding apparatus.

* * * * *